(12) United States Patent
Chen

(10) Patent No.: US 8,988,487 B2
(45) Date of Patent: Mar. 24, 2015

(54) CLOUD VIDEO EXCHANGING CONFERENCE DEVICE

(71) Applicant: Yen-Tso Chen, Taipei (TW)

(72) Inventor: Yen-Tso Chen, Taipei (TW)

(73) Assignee: Yen-Tso Chen, Neihu Dist., Taipei (TW)

( * ) Notice: Subject to any disclaimer, the term of this patent is extended or adjusted under 35 U.S.C. 154(b) by 100 days.

(21) Appl. No.: 13/905,142

(22) Filed: May 30, 2013

(65) Prior Publication Data

US 2014/0225981 A1 Aug. 14, 2014

(30) Foreign Application Priority Data

Feb. 8, 2013 (TW) .............................. 102105299 A

(51) Int. Cl.
*H04N 7/15* (2006.01)
*H04L 12/18* (2006.01)
*H04L 29/06* (2006.01)

(52) U.S. Cl.
CPC ............ *H04N 7/152* (2013.01); *H04L 12/1818* (2013.01); *H04L 65/1069* (2013.01); *H04L 65/4038* (2013.01)
USPC .................... 348/14.09; 348/14.08; 348/14.12

(58) Field of Classification Search
CPC ...... H04N 7/15; H04N 7/152; H04L 65/1069; H04L 12/1818
USPC ............................................ 348/14.01–14.16
See application file for complete search history.

(56) References Cited

U.S. PATENT DOCUMENTS

2013/0339781 A1* 12/2013 Wamorkar et al. ............ 714/4.2
2014/0112211 A1* 4/2014 Walters ......................... 370/261

* cited by examiner

*Primary Examiner* — Melur Ramakrishnaiah
(74) *Attorney, Agent, or Firm* — Winston Hsu; Scott Margo

(57) ABSTRACT

The present invention discloses a cloud video exchanging conference device. The cloud video conference device includes at least one multi-point control unit, corresponding to at least one representative number, connecting to the Internet via at least one Internet Protocol address; a backend management module, for corresponding the at least one representative number to the at least one Internet Protocol address; and at least one video conference operating module, for obtaining a corresponding specific Internet Protocol address among the at least one Internet Protocol address via the backend management module according to a specific representative number among the at least one representative number, to connect to a corresponding specific multi-point control unit among the at least one multi-point control unit for video exchanging conference.

12 Claims, 3 Drawing Sheets

| Internet Protocol address | Multi-point control unit | Account | Representative number |
|---|---|---|---|
| IP$_X$ | CID$_A$ | | 02 8923 7350 |
| IP$_X$ | CID$_B$ | C1 | 09xx xxx xx1 |
| IP$_X$ | CID$_B$ | C2 | 09xx xxx xx2 |
| IP$_X$ | CID$_B$ | Cn | 09xx xxx xxn |

FIG. 2

CLOUD VIDEO EXCHANGING CONFERENCE DEVICE

BACKGROUND OF THE INVENTION

1. Field of the Invention

The present invention relates to a cloud video exchanging conference device, and more particularly, to a cloud video exchanging conference device capable of achieving a video conference by a way resembling to a telephone switchboard method to enhance ease of use.

2. Description of the Prior Art

With the Internet being highly developed today, it has made a convenient life than it was ever imagined, which greatly changes many living styles.

Many technologies have been extended owing to the development of the Internet. Among those technologies, an Internet video conference can be held by related devices through the Internet connections to allow people at different places holding meetings just like being at the same meeting room. Therefore, things which cannot be clearly described by letters can be more accurately expressed by the Internet video conference.

The Internet video conference in the market generally requires that people who want to hold the meeting in two or more places use the same device platform simultaneously to login the account and enter the same video conference channel to connect with each other before the meeting.

However, the above conventional Internet video conference has problems and flaws as follows when used:

1. It requires constructing the hardware device thereof, which leads to additional cost.
2. The device platform is hard to be promoted due to high price and thereby is unpopular, which debases its good intentions of ease of use.
3. It needs a corresponding communication before entering different video conference channels, and therefore, causes great inconvenience when it is used.

Thus, there is a need to improve the prior art.

SUMMARY OF THE INVENTION

It is therefore an objective of the present invention to provide a cloud video exchanging conference device capable of setting up video conferences by a way resembling to a telephone switchboard method so as to enhance the ease of use.

The present invention discloses a cloud video exchanging conference device, comprising at least one multi-point control unit, corresponding to at least one representative number, connecting to the Internet via at least one Internet Protocol address; a backend management module, for corresponding the at least one representative number to the at least one Internet Protocol address; and at least one video conference operating module, for obtaining a corresponding specific Internet Protocol address among the at least one Internet Protocol address via the backend management module according to a specific representative number among the at least one representative number, to connect to a corresponding specific multi-point control unit among the at least one multi-point control unit for video exchanging conference.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 shows a table used in a backend management module shown in FIG. 1 for corresponding the representative number to the Internet Protocol address.

DETAILED DESCRIPTION

Figure 1:
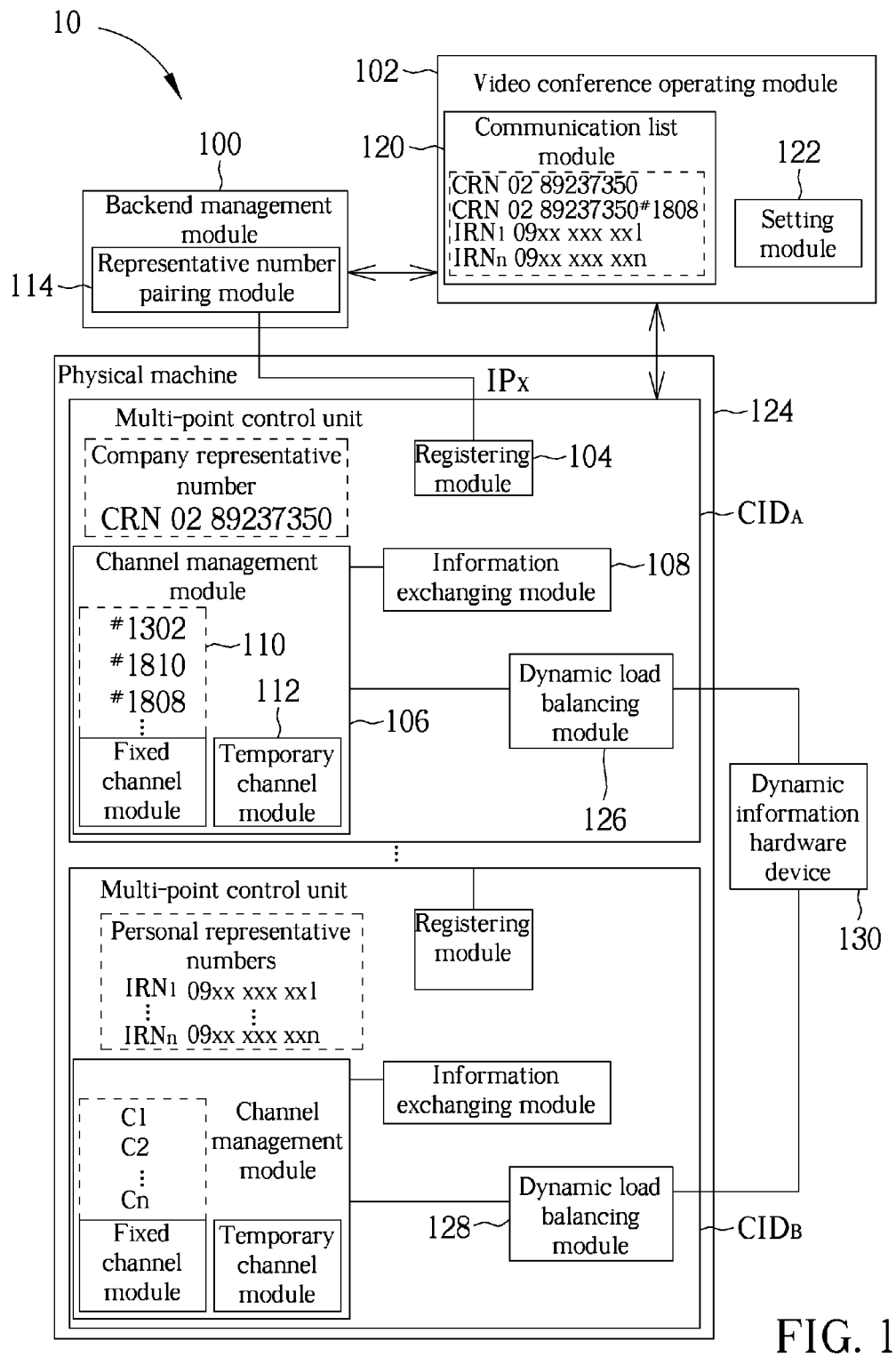
FIG. 1 illustrates a schematic diagram of a cloud video exchanging conference device according to an embodiment of the present invention.

Please refer to FIG. 1, which is a schematic diagram of a cloud video exchanging conference device 10 according to an embodiment of the present invention. As shown in FIG. 1, the cloud video exchanging conference device 10 includes multi-point control units (MCU) $CID_A$, $CID_B$, a backend management module 100 and a video conference operating module 102. In short, multi-point control units $CID_A$, $CID_B$ are corresponding to a company representative number CRN (e.g. a company telephone number), personal representative numbers $IRN_1$-$IRN_n$, respectively, and connect to the Internet via an Internet Protocol address $IP_x$. The backend management module 100 acts in a way analogous to a telephone switchboard to correspond the company representative number CRN and the personal representative numbers $IRN_1$-$IRN_n$ to the Internet Protocol address $IP_x$. By utilizing the backend management module 100 to obtain the Internet Protocol address $IP_x$, the video conference operating module 102 connects the multi-point control units $CID_A$ or $CID_B$ according to the company representative number CRN or the personal representative numbers $IRN_1$-$IRN_n$ to set up the video exchanging conference.

In such a condition, by utilizing the backend management module 100 to correspond the representative number to the corresponding Internet Protocol addresses of multi-point control units using the way resembling to a telephone switchboard method, a user only needs the video conference operating module 102 to connect to a specific multi-point control unit via a specific representative number, to have a video exchanging conference with another user of another video conference operating module. The user may download software to a personal information device connecting to the Internet (e.g. devices with Internet connection and video features such as personal computer, laptop, smart phone, and personal digital assistant) to setup the video conference operating module 102 in the personal information device. As a result, the present invention can set up video conference via away resembling to the telephone switchboard method. Therefore, the user does not need to change settings due to change of the Internet Protocol addresses, and additional dedicated hardware is not required, which enhances ease of use.

In detail, please refer to FIG. 1 and FIG. 2 together. FIG. 2 is a table used in the backend management module 100 of FIG. 1 to correspond the representative numbers CRN, $IRN_1$-$IRN_n$, to the Internet Protocol address $IP_x$. As shown in FIG. 1, the multi-point control unit $CID_A$ includes a registering module 104, a channel management module 106 and an information exchanging module 108. The channel management module 106 includes a fixed channel module 110 and a temporary channel module 112. The backend management module 100 includes a representative number pairing module 114. The video conference operating module 102 includes a communication list module 120 and a setting module 122.

Under such structure, as shown in FIG. 1 and FIG. 2, when the multi-point control unit $CID_A$ configured in a physical machine 124 connects the Internet via the Internet Protocol address $IP_x$, the registering module 104 sends the Internet Protocol address $IP_x$ to the backend management module 100 for the representative number pairing module 114 thereof to correspond the Internet Protocol address $IP_x$ with the company representative number CRN. Similarly, when the multi-point control unit $CID_B$ configured in the same physical machine 124 also connects to the Internet via the same Internet Protocol address $IP_x$, the Internet Protocol address $IP_x$ is sent to the backend management module 100 to correspond with the personal representative numbers $IRN_1$-$IRN_n$.

Next, when at least one video conference operating module connects to the multi-point control unit $CID_A$ via the backend management module 100, the channel management module 106 manages video exchanging conference connection (e.g. maintenance of member list, schedule of regular video conference, invitation for internal fixed account members and connection setting for external meetings) of at least one account among the at least one video conference operating module. Then, the information exchanging module 108 sets up the video exchanging conference for at least two of the at least one video conference operating module. In the channel management module 106, the fixed channel module 110 provides connections for those having a fixed account (e.g. extension numbers of the company phone #1302, #1810, #1808, or external users who often connect the multi-point control unit $CID_A$ and have fixed accounts) in the multi-point control unit $CID_A$ among the at least one video conference operating module. The temporary channel module 112 provides connections for those not having a fixed account in the multi-point control unit $CID_A$ among the at least one video conference operating module. Note that the operations of the multi-point control unit $CID_B$ and the multi-point control unit $CID_A$ are substantially the same, so one may refer related descriptions for the multi-point control unit $CID_A$ for the operations of corresponding components in multi-point control unit $CID_B$. Main difference between the multi-point control unit $CID_B$ and the multi-point control unit $CID_A$ is that the multi-point control unit $CID_B$ is corresponding to individual users while the multi-point control unit $CID_A$ is corresponding to a company. Therefore, those who have a fixed account in the multi-point control unit $CID_B$ such as a personal line or a personal cell phone number may rent a specific fixed account in the multi-point control unit $CID_B$ to obtain the service without requiring a switchboard to transfer the line like the accounts in the multi-point control unit $CID_A$. As a result, the present invention allows users having a fixed account and users not having a fixed account communicating through the fixed channel and the temporary channel, respectively, for video exchanging conferences. Thus, unlike the conventional methods, the present invention does not require communication and related contacts beforehand, and greatly saves the tedious works for the current video conference for users' convenience.

On the other hand, when the video conference operating module 102 needs to connect a specific company or a person, since the communication list module 120 has saved representative numbers previously connected (as shown in FIG. 1 which illustrates the communication list module 120 has saved the company representative number CRN, an extension number #1808 of the company representative number CRN, and the personal representative numbers $IRN_1$, $IRN_n$), the video conference operating module 102 connects to the backend management module 100 to obtain the Internet Protocol address according to the saved company representative number, the saved extension number of the company representative number, or the saved personal representative number that needs to be connected (i.e. when receiving a specific representative number, the representative number pairing module 114 recognizes and compares the specific representative number with saved representative numbers, and then returns a specific Internet Protocol address). After that, the setting module 122 configures the Internet Protocol address to connect to the specific multi-point control unit.

For example, after the user launches the video conference operating module 102 in the personal information device and connects the backend management module 100 to obtain the corresponding Internet Protocol address $IP_x$ according to the saved company representative number CRN (in other embodiments, if the video conference operating module 102 has not saved the company representative number CRN, the user may input the company representative number CRN instead), the video conference operating module 102 sets the Internet Protocol address IP, connecting to the multi-point control units $CID_A$. At this moment, if the video conference operating module 102 has a fixed account, the fixed channel module 110 opens a fixed channel for connection. If the video conference operating module 102 does not have a fixed account, the temporary channel module 112 opens a temporary channel for connection (in order to avoid those not having a fixed account occupying the system resource, the video conference operating module 102 maybe set to close the corresponding temporary channels if those not having a fixed account idle more than a specific time).

Next, after logging in the multi-point control unit $CID_A$, the video conference operating module 102 waits other video conference operating module for starting video conference, or finds another video conference operating module which has logged in the multi-point control unit $CID_A$ for video conference (e.g. having the video conference with the video conference operating module corresponding to the extension numbers #1302, #1810, #1808 of the company representative number CRN). When at least one video conference operating module agrees to have video conference with the video conference operating module 102, the multi-point control unit $CID_A$ moves the connection to the information exchanging module 108 for the video conference, dynamically generates a conference process to exchange video, audio and data, and shows that a conference is on-going. If other video conference operating modules which have logged in the multi-point control unit $CID_A$ want to enter the conference, they need to pass a security certification before entering the conference. After the conference is finished, the multi-point control unit $CID_A$ immediately arranges the video conference operating modules which joined the conference to connect to the fixed channel module 110 or the temporary channel module 112 according to the initial status before entering the conference. Then, the information exchanging module 108 eliminates the conference process which was dynamically generated. As a result, the video conference operating module 102 and the multi-point control unit $CID_A$ do not need to communicate previously (e.g. notifying each other of the account, finding the targets or names of the communication channel, etc.). Therefore, the video conference operating module 102 can directly communicate with the target who wants to join the conference, and achieve progressiveness of using video conference practically.

Noticeably, in the above embodiments, the video conference operating module 102 logs in the multi-point control unit $CID_A$ according to the company representative number CRN, and thus the channel management module 106 determines extension accounts of video conference for the video conference operating module 102 to select from based on whether the video conference operating module 102 has a fixed account. For example, if the video conference operating module 102 logs in using a fixed account, the channel management module 106 is able to provide all the accounts of the channel management modules on-line for the video conference operating module 102 to select from to setup video conference. On the contrary, if the video conference operating module 102 logs in using a non-fixed account, the channel management module 106 may provide extension accounts of switchboard, customer service department or sales department for the video conference operating module 102 to select from and then transfer the line to an appropriate extension account to setup video conference.

Besides, in the above embodiments, the video conference operating module 102 logs in the multi-point control unit $CID_A$ according to the company representative number CRN, so the channel management module 106 determines extension accounts of video conference for the video conference operating module 102 to select from based on whether the video conference operating module 102 has a fixed account or not. In other embodiments, the video conference operating module 102 may log in the multi-point control unit $CID_A$ trying to directly reach the extension account #1808 of the company representative number CRN so that the step of transferring the line by the account switchboard of the multi-point control unit $CID_A$ may be skipped and directly communicate with the corresponding video conference operating module of the extension account #1808 of the company representative number CRN for video conference. Moreover, the video conference operating module 102 may also log in the multi-point control unit $CID_B$ trying to directly reach the personal representative numbers $IRN_1$-$IRN_n$, and then utilize the fixed channel or the temporary channel to communicate the video conference operating modules corresponding to accounts C1-Cn for video conference.

Noticeably, the present invention is capable of utilizing the backend management module 100 to correspond the representative number to the corresponding Internet Protocol addresses of multi-point control units by using the way resembling to the telephone switchboard method such that a user only needs the video conference operating module 102 to have the video exchanging conference with another video conference operating module user by a specific representative number connecting to a specific multi-point control unit. Therefore, the user does not need to change settings due to change of the Internet Protocol address, and additional dedicated hardware is not required, which enhances ease of use. Those skilled in the art can make modifications or alterations accordingly. For example, in the above embodiments, the multi-point control units $CID_A$, $CID_B$ are disposed in the same physical machine 124 and thereby using the same Internet Protocol address $IP_x$ to connect the Internet, and the specific multi-point control unit which needs to be connected is determined by the specific representative number after the video conference operating module 102 connects to the physical machine 124 through the Internet Protocol address $IP_x$. In other embodiments, the multi-point control units $CID_A$, $CID_B$ may be disposed in different physical machines and thereby using different Internet Protocol addresses to connect the Internet, and the video conference operating module 102 may connect to different physical machines 124 through different Internet Protocol addresses and then connect to specific multi-point control units.

Besides, as shown in FIG. 1, since the physical machine 124 in which the multi-point control units $CID_A$, $CID_B$ are disposed may be limited by the area where the physical machine 124 is located and the Internet bandwidth and thereby cause inefficient for use, the multi-point control units $CID_A$, $CID_B$ may further include dynamic load balancing modules 126, 128, for arranging at least two of the video conference operating modules which are connected for video conference to perform video exchanging conference in a dynamic information hardware device 130 outside the multi-point control units $CID_A$, $CID_B$ (i.e. operation of dynamic information hardware device 130 is substantially the same with that of information exchanging module 108, but the dynamic information hardware device 130 is disposed in a different area outside the multi-point control units $CID_A$, $CID_B$ so as to balance the load dynamically).

For example, when the multi-point control unit $CID_A$ serving companies finds there are too many extension accounts performing video exchanging conference, the dynamic information hardware device 130 may be utilized to reduce the loading. Alternatively, when the multi-point control unit $CID_B$ serving individuals finds the video conference operating modules connected for video exchanging conference are spread too widely (compared to each extension account user in a company who locates at a nearby area with each other, the area range of individual users is usually larger), the multi-point control unit $CID_B$ may provide the video conference operating module to log in to search other video conference operating modules which want to have video exchanging conference. Then, the dynamic load balancing module 128 may search and arrange the dynamic information hardware device 130 which is capable of handling the loading and is located near most of the video conference operating modules for a specific video exchanging conference. In other words, the multi-point control unit $CID_B$ may provide the log-in and pairing functions only, and the dynamic information hardware devices disposed outside report the loading and location thereof to the dynamic load balancing module 128 for allowing the multi-point control unit $CID_B$ selecting appropriate dynamic information hardware devices for the specific video exchanging conference. As a result, the present invention is capable of balancing the hardware device loading, so as to reduce the hardware loading and balance the loading.

Figure 3:
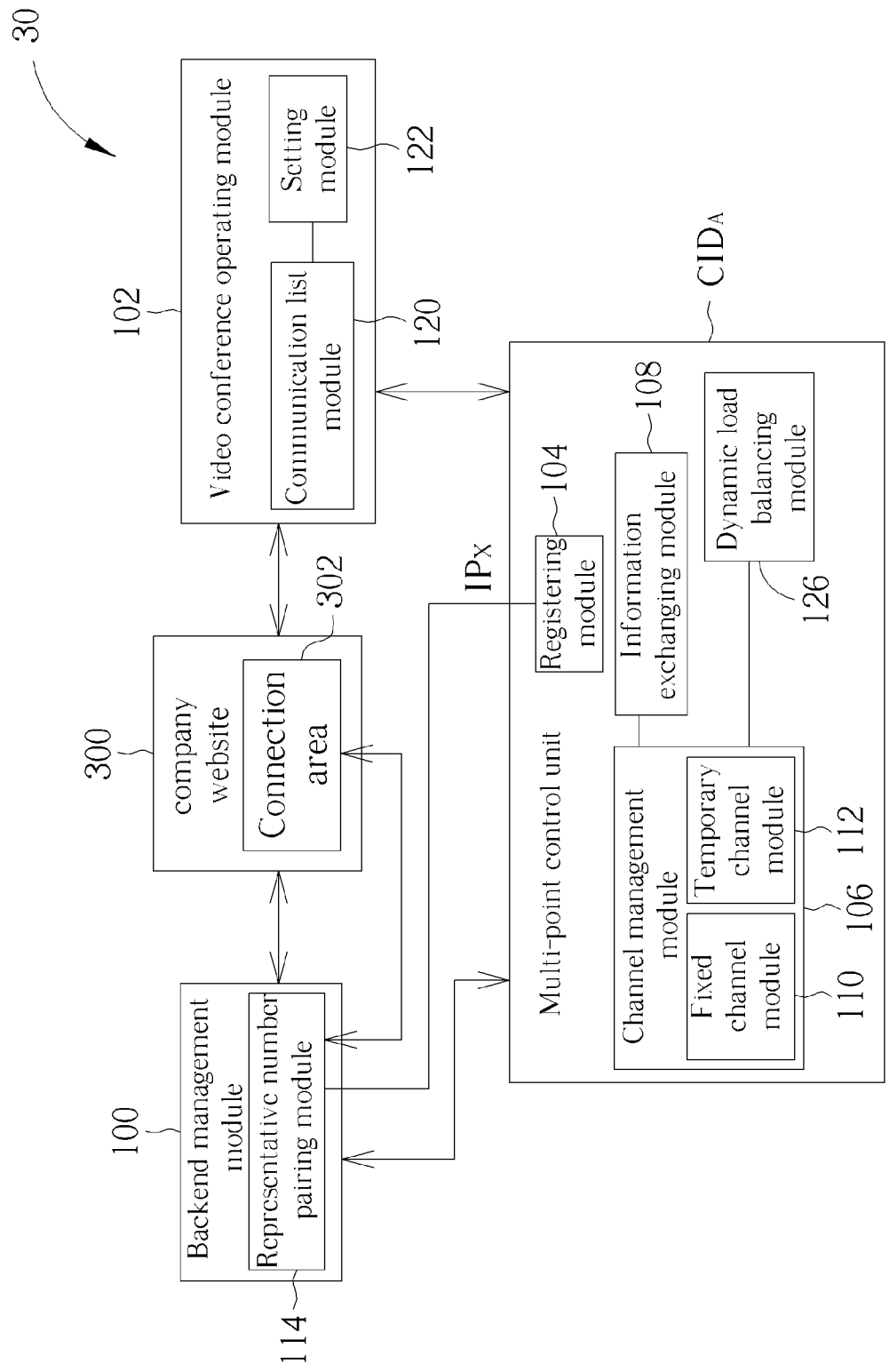
FIG. 3 illustrates a schematic diagram of another cloud video exchanging conference device according to another embodiment of the present invention.

Besides, in the above embodiments, the user makes connection by the representative number previously stored in the video conference operating module 102 or inputted by the user. However, when the user does not store the representative number or connects the multi-point control unit at the first time without knowing the company representative number, the user may also connect the specific multi-point control unit through a corresponding company website. Please refer to FIG. 3, which illustrates a schematic diagram of another cloud video exchanging conference device 30 according to an embodiment of the present invention. The cloud video exchanging conference device 30 is substantially similar to the cloud video exchanging conference device 10, so elements with similar function are denoted by the same symbol. Main difference between the cloud video exchanging conference device 30 and the cloud video exchanging conference device 10 is that the cloud video exchanging conference device 30 further includes a company website 300, wherein a connection area 302 of the company website 300 obtains Internet Protocol address $IP_x$ and company representative number CRN to which the multi-point control unit $CID_A$ is connected by the backend management module 100, or Internet Protocol address $IP_x$ and company representative number CRN to which the multi-point control unit $CID_A$ is connected may be obtained from the website administrator's direct input in the connection area 302.

In such a condition, when the user uses the personal information device to connect the multi-point control unit $CID_A$ at the first time without knowing the company representative number, the user may enter the company website 300 of the multi-point control unit $CID_A$ by searching the Internet. Then, if the personal information device does not contain the video conference operating module 102, the user may download the software from the company website 300 to the personal information device to form the video conference operating module 102, and the video conference operating module 102 connects to the connection area 302 of the company website 300 to obtain the Internet Protocol address IP, and the company representative number CRN afterward (if the personal information device has already contained the video conference operating module 102, the video conference operating module 102 may directly connect to the connection area 302 of the company website 300), so as to connect to the multi-point control unit $CID_A$. Note that the connection area 302 of the company website 300 for the multi-point control unit $CID_A$ may also save the company representative number CRN only. After the video conference operating module 102 connects the connection area 302 of the company website 300 to get the company representative number CRN, the video conference operating module 102 obtains the Internet Protocol address IP, to which the multi-point control unit $CID_A$ is connected by using the backend management module 100. Under such condition, the user can rapidly enter the predetermined multi-point control unit for video conference by searching the Internet without additionally setting dedicated hardware, so as to achieve improvement for convenient use of video conference and promote its ease-of-use advantage.

In the conventional Internet video conference, additional hardware equipments are required so that the device platform is costly and hard to be promoted. Therefore, the number of users is rather low, which debases its good intention of ease of use. In addition, related pre-connections need to be configured before the user enters different video conference channels, which greatly reduces convenience of use. On the contrary, the present invention utilizes the backend management module 100 to correspond the representative number to the corresponding Internet Protocol addresses of multi-point control units by using the way resembling to the telephone switchboard method such that a user only needs the video conference operating module 102 to have the video exchanging conference with another video conference operating module user by a specific representative number connecting to a specific multi-point control unit. Therefore, the user does not need to change settings due to change of the Internet Protocol address, and additional dedicated hardware is not required, which enhances ease of use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cloud video exchanging conference device, comprising:
   at least one multi-point control unit, corresponding to at least one representative number, connecting to Internet via at least one Internet Protocol address;
   a backend management module, for corresponding the at least one representative number to the at least one Internet Protocol address; and
   at least one video conference operating module, for obtaining a corresponding specific Internet Protocol address among the at least one Internet Protocol address via the backend management module according to a specific representative number among the at least one representative number, to connect to a corresponding specific multi-point control unit among the at least one multi-point control unit for video exchanging conferences;
   wherein the specific multi-point control unit comprises:
      a registering module, for transmitting the specific Internet Protocol address to the backend management module to correspond to the specific representative number when the specific multi-point control unit connects to Internet via the specific Internet Protocol address;
      a channel management module, for managing video exchanging conference connection of at least one account among the at least one video conference operating module; and
      an information exchanging module, for performing video exchanging conference between at least two of the at least one video conference operating module.

2. The cloud video exchanging conference device of claim 1, wherein the specific multi-point control unit is corresponding to a company representative number.

3. The cloud video exchanging conference device of claim 1, wherein the specific multi-point control unit is corresponding to a plurality of personal representative numbers.

4. The cloud video exchanging conference device of claim 1, wherein the channel management module comprises:
   a fixed channel module, for providing a connection for a video conference operating module having a fixed account in the specific multi-point control unit among the at least one video conference operating module; and
   a temporary channel module, for providing a connection for a video conference operating module not having a fixed account in the specific multi-point control unit among the at least one video conference operating module.

5. The cloud video exchanging conference device of claim 1, wherein the specific multi-point control unit further comprises a dynamic load balancing module, for arranging the at least two of the at least one video conference operating module to perform video exchanging conference in a dynamic information hardware device outside the specific multi-point control unit.

6. The cloud video exchanging conference device of claim 1, wherein at least two of the at least one multi-point control unit are configured in a same physical machine, and connect to Internet via a same Internet Protocol address.

7. The cloud video exchanging conference device of claim 1, wherein each video conference operating module of the at least one video conference operating module comprises:
   a communication list module, for storing at least one representative number previously connected; and
   a setting module, for setting the specific Internet Protocol address to connect to the specific multi-point control unit.

8. The cloud video exchanging conference device of claim 1, wherein at least one first video conference operating module among the at least one video conference operating module connects to the backend management module for obtaining the specific Internet Protocol address according to the specific representative number which is previously stored.

9. The cloud video exchanging conference device of claim 1, wherein at least one first video conference operating module among the at least one video conference operating module connects to the backend management module for obtaining the specific Internet Protocol address according to the specific representative number which is inputted by a user.

10. The cloud video exchanging conference device of claim 1 further comprising a company website corresponding to the specific multi-point control unit, wherein at least one second video conference operating module among the at least one video conference operating module obtains the specific Internet Protocol address via a connection area of the company website.

11. The cloud video exchanging conference device of claim 1, wherein at least two of the at least one multi-point control unit are configured in different physical machines, and connect to Internet via different Internet Protocol addresses.

12. The cloud video exchanging conference device of claim 1, wherein the backend management module comprises a representative number pairing module, for corresponding the at least one representative number with the at least one Internet Protocol address.

\* \* \* \* \*